Figure 9:
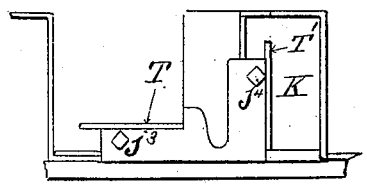

(No Model.) 5 Sheets—Sheet 1.
L. K. JOHNSON & A. A. LOW.
COMPOSITOR'S TYPE CASE.
No. 397,003. Patented Jan. 29, 1889.
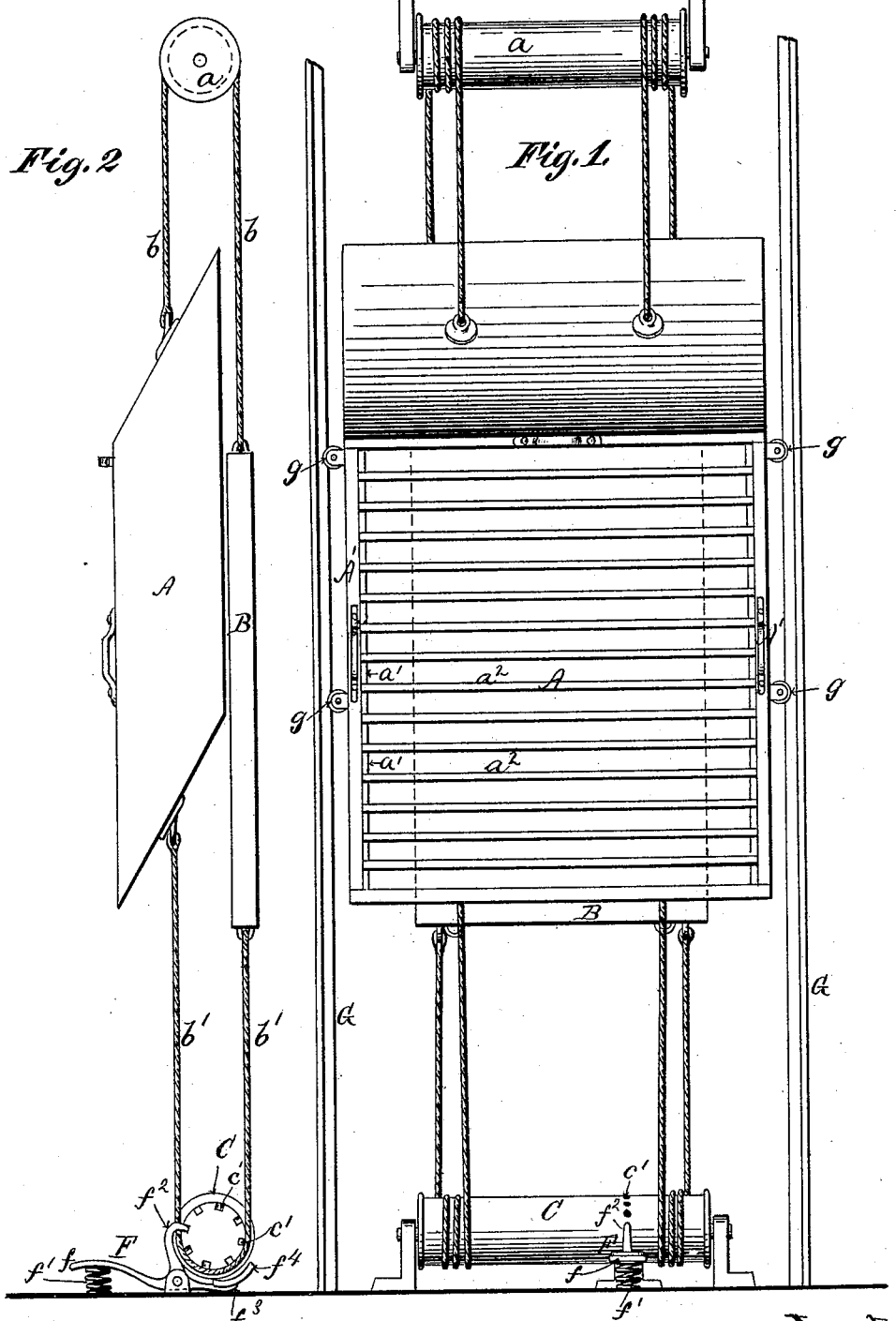

(No Model.) 5 Sheets—Sheet 2.
L. K. JOHNSON & A. A. LOW.
COMPOSITOR'S TYPE CASE.
No. 397,003. Patented Jan. 29, 1889.
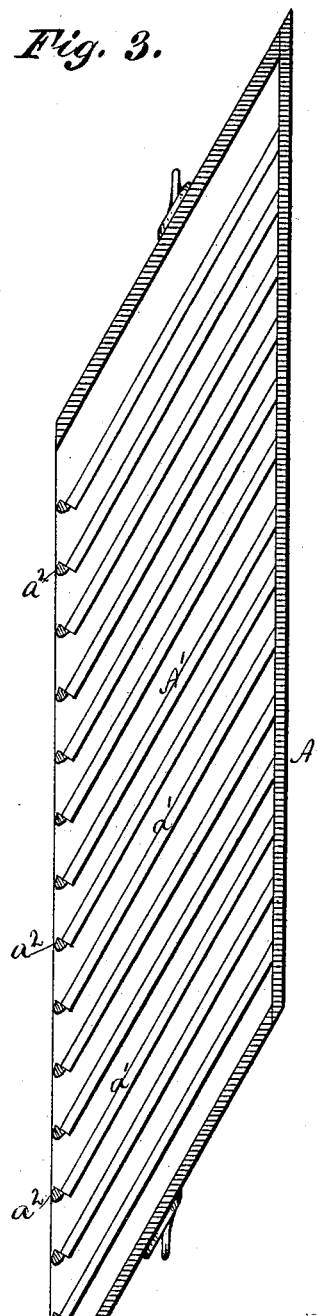
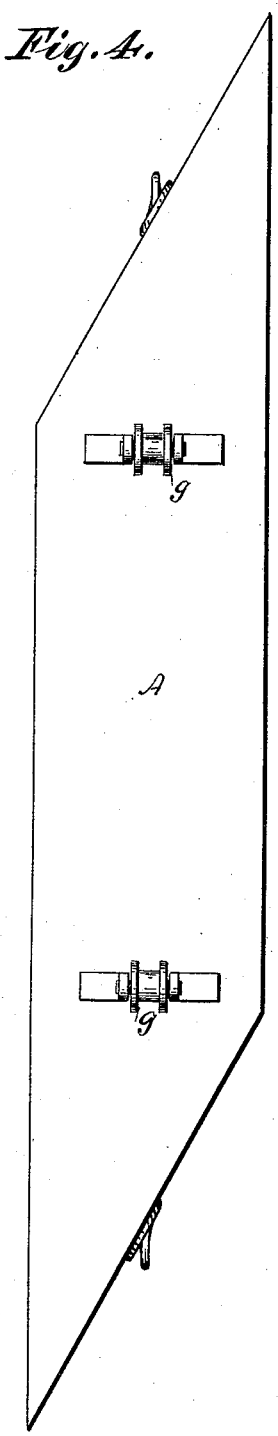
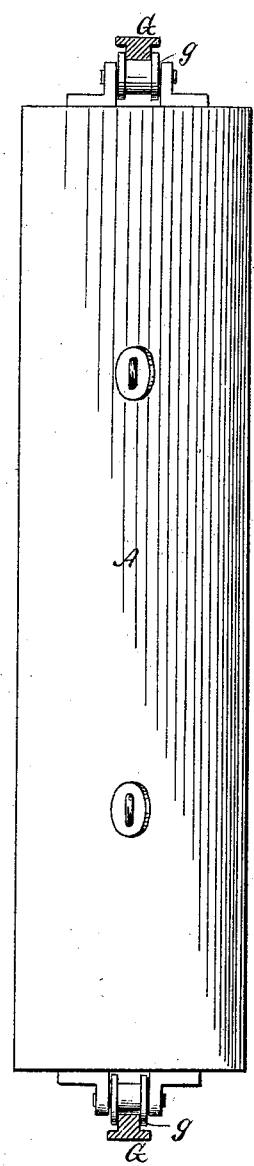

(No Model.) 5 Sheets—Sheet 3.
L. K. JOHNSON & A. A. LOW.
COMPOSITOR'S TYPE CASE.
No. 397,003. Patented Jan. 29, 1889.
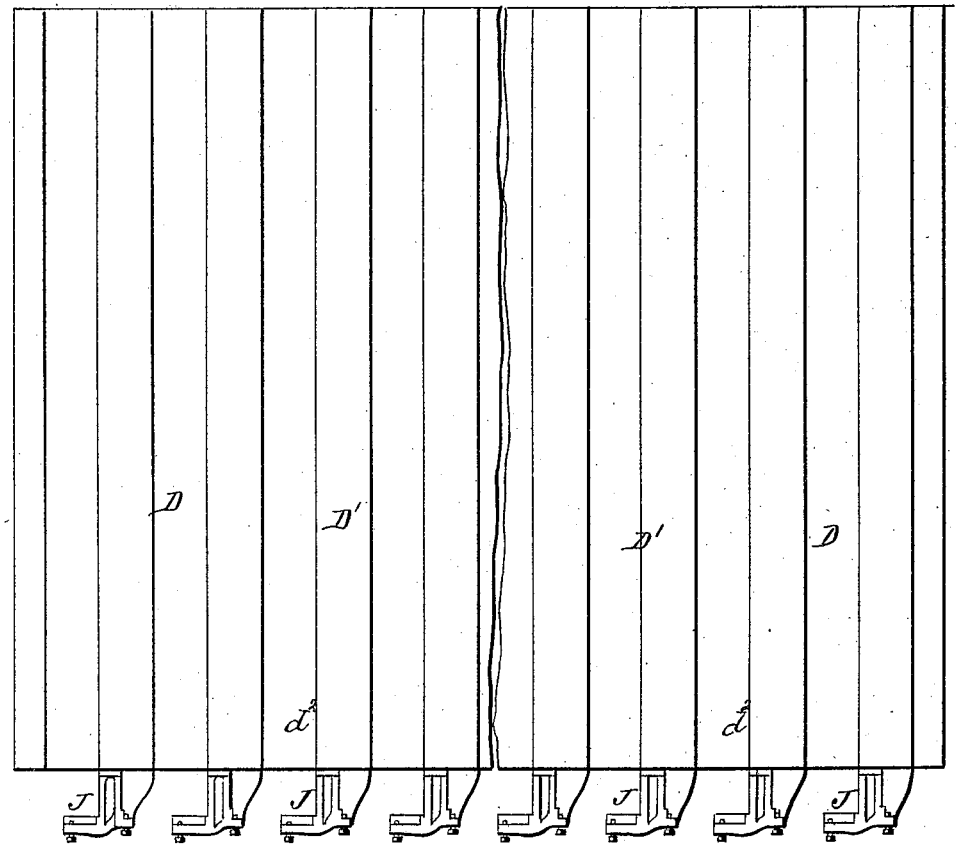
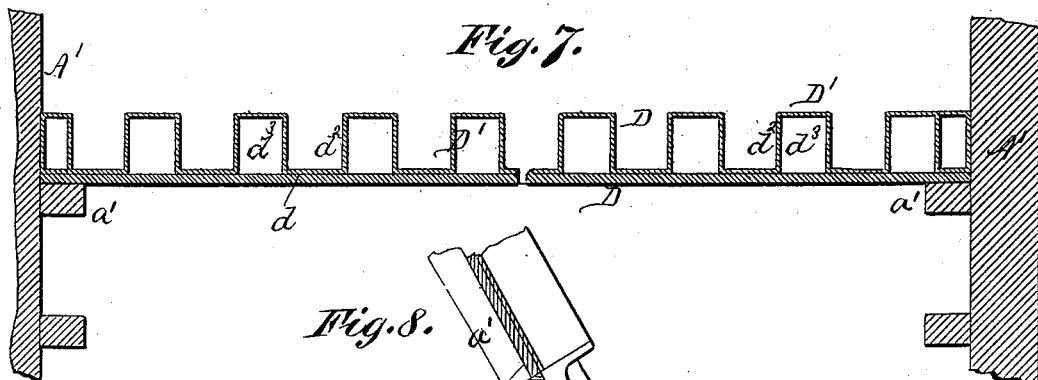
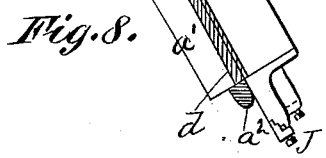

(No Model.) 5 Sheets—Sheet 4.

L. K. JOHNSON & A. A. LOW.
COMPOSITOR'S TYPE CASE.

No. 397,003. Patented Jan. 29, 1889.

Witnesses:

Inventors:
Louis K. Johnson,
A. Augustus Low,
By their Attorney

N. PETERS, Photo-Lithographer, Washington, D. C.

(No Model.) 5 Sheets—Sheet 5.

L. K. JOHNSON & A. A. LOW.
COMPOSITOR'S TYPE CASE.

No. 397,003. Patented Jan. 29, 1889.

# UNITED STATES PATENT OFFICE.

LOUIS K. JOHNSON AND ABBOT AUGUSTUS LOW, OF BROOKLYN, ASSIGNORS TO THE ALDEN TYPE MACHINE COMPANY, OF NEW YORK, N. Y.

COMPOSITOR'S TYPE-CASE.

SPECIFICATION forming part of Letters Patent No. 397,003, dated January 29, 1889.

Application filed July 3, 1886. Renewed July 23, 1888. Serial No. 280,827. (No model.)

*To all whom it may concern:*

Be it known that we, LOUIS K. JOHNSON and ABBOT AUGUSTUS LOW, citizens of the United States, residing in the city of Brooklyn, in the county of Kings and State of New York, have invented certain new and useful Improvements in Compositors' Type-Cases, of which the following is a specification.

These improvements relate to the class of compositor's type-cases in which the types are removed from the lower ends of type-containing channels, in which the types are arranged in lines or columns in prescribed position with relation to each other, as set forth in Patents Nos. 230,784, 254,019, 263,707, 271,711, 279,168, and 268,409.

The object of the present invention is to render this class of compositor's cases more compact and convenient than heretofore; and the main features of the invention consist, first, in combining and arranging the type and channel supports, &c., in such manner that two or even three channels are accommodated and their types presented for use in but little more than the space heretofore monopolized by a single channel, including in this connection the special form of a duplex "finger-piece;" secondly, in a compositor's case formed to accommodate two, three, or more sorts of types, the containing-channels being arranged in parallel series upon bed-plates which are removable from the case bodily, and the case itself being counterweighted and arranged to be raised or lowered vertically to suit the convenience of the compositor by suitable means, which also sustain it in the required position; and, lastly, in certain features of combination and construction hereinafter described.

By utilizing the spaces in the case heretofore practically valueless, by the use of the duplex finger-pieces, the working area or face of the case can be materially reduced, thus proportionately reducing the time and labor involved in the operations of setting, since the hand of the compositor has to travel in the aggregate a much less distance than heretofore. The cost of construction is also materially reduced, since double or treble the number of channels, &c., can be provided for without any material increase in the quantity of material used in constructing the case, while the simplicity of the means for adjusting and supporting the type-columns renders the cost of the duplex finger-piece but little, if any, greater than the old form of single finger-piece.

Since compositors upon ordinary "solid matter"—such as newspaper work, &c.—usually have resource to three separate cases or sorts of type—as agate, nonpareil, and minion—which have heretofore been arranged in separate cases, it is obvious that by concentrating all the types required in a single case, the different portions of which case may be easily and quickly brought into easy reach for use by the operator without change of position upon his part, the operations of composition will be materially facilitated.

Figure 11:
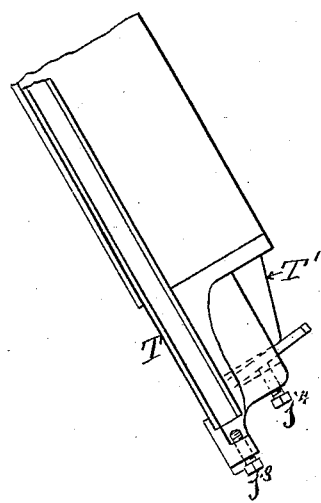
Figure 12:
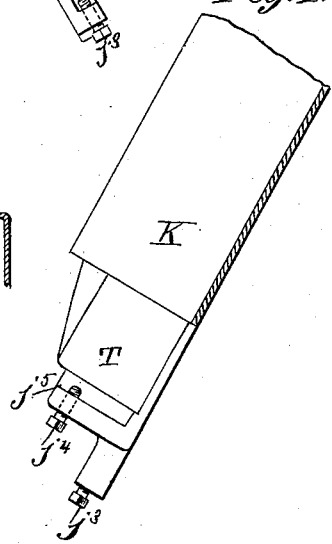
Figure 13:
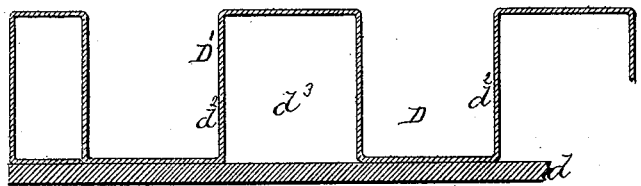
Figure 14:
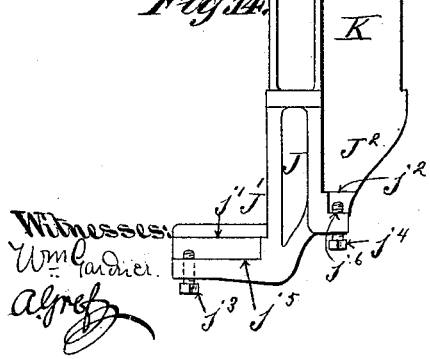
Figure 15:
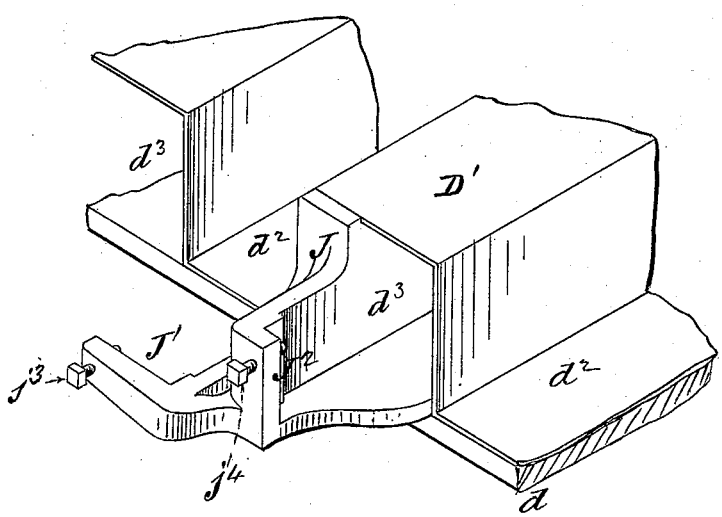

In the accompanying drawings, Figure 1 is a front elevation of our suspended type-channel case without the channels, &c.; Fig 2, a side elevation of the same, the vertical rail upon that side being omitted and the lower drum being shown in section to more clearly illustrate the action of the detent. Fig. 3 is a vertical section of the body of the case with the type-channels and their beds removed. Fig. 4 is a side elevation, and Fig. 5 a top view, of the same. Fig. 6 is a front of one of the type-channel beds removed from the case; Fig. 7, a transverse section of the same and the adjoining portions of the sides of the case. Fig. 8 is a detail view illustrating the method of supporting the front edges of the channel-beds by stationary shoulders extending across the face of the case. Figs. 9 to 14, inclusive, are detail views, full size, of the duplex finger-pieces and adjoining parts of the channel-bed. Fig. 9 represents an end view, and Fig. 10 a face view, of the said finger-piece and the lower extremities of type-containing channels resting therein; Figs. 11 and 12, opposite side elevations of the same; Fig. 13, a transverse section of a portion of the channel-bed, and Fig. 14 a face view of a duplex finger-piece detached from the channel-bed. Fig. 15 is an isometrical view of the duplex finger-piece.

The body A of our improved compositor's case is suspended vertically in such manner that it may be conveniently elevated or lowered by the compositor when he desires to have access to type-channels higher or lower than those immediately opposite him in the case.

It is obvious that various means may be employed for thus raising or lowering the case bodily, and we do not wish to confine ourselves strictly to the special construction and arrangement shown and described herein, as other well-known means may be substituted therefor; but for simplicity, and to enable the operator to readily and positively control the case in motion or at rest without leaving his position in front of it, we prefer to use means substantially like those shown in the accompanying drawings, in which the case A is suspended from an elevated pulley or windlass, $a$, by wire ropes $b\,b$, or their equivalents, and has its weight neutralized by a counter-weight, B. To hold the parts taut and steady and to afford means for locking them in a desired position and controlling their speed when in motion, other lower wire ropes, $b'\,b'$, or equivalents, are attached to the under sides of the case A and weight B, passing around a lower windlass or drum, C, suitably mounted in stationary bearings. By passing either or both of the ropes $b\,b'$ one or more times around their respective drums, according to the weight and strain to which they are to be subjected, all danger of their slipping over the drums will be obviated; and it hence only remains to provide suitable means for preventing or controlling the revolution of one of the drums in order to effectually operate and govern the whole apparatus.

In the drawings provision is made for thus controlling the motion of the lower drum, C, by the foot of the operator, thereby obviating the necessity of his moving or changing his position in front of the case, and also leaving his hands free to direct the movement of the case; although it is obvious that the same result may be effected by other mechanical means.

Referring to the construction shown herein, the foot-lever F, fulcrumed in suitable bearings, is formed upon one side of its fulcrum with the foot-rest $f$, underneath which is arranged spring $f'$, which tends constantly to cause the pawl $f^2$ to press against the periphery of the drum C, and thereby engage with one of the recesses or notches $c'$ formed therein. The lever F is also formed with an arm, $f^3$, which projects underneath the drum C, said arm being formed with a brake-shoe, $f^4$, which, when the outer end of the lever F is depressed and the pawl $f^2$ thereby withdrawn from the notches $c'$ in the drum C, engages with the periphery of the said drum, so that the operator by varying the pressure exerted upon the outer end, $f$, of the lever F can control the rotation of the drum in either direction.

In order to prevent lateral movement or swing of the case A, it is preferably held and guided between two or more vertical ways or rails, G, suitable friction-wheels, $g\,g$, being arranged at proper intervals upon the sides of the case to engage therewith; or any desirable arrangement of upright grooves or guides may be substituted therefor. In like manner the special method of suspension shown herein may be varied in accordance with circumstances of use or situation.

In Figs. 1, 2, 3, 4, and 5 the body of the case alone is shown, the type-containing channel plates or beds D being omitted, but their supports $a'\,a^2$ within the case being shown in Figs. 1 and 3, in which $a'\,a'$ represent the inclined parallel ribs or supports arranged upon each side wall, A' A', of the case, while $a^2\,a^2$ represent the transverse supporting rods or shoulders, which extend at the front of the case between the said side walls, A' A'.

The transverse rods or shoulders $a^2\,a^2$ are situated so as to project slightly above the upper edges of the inclined supports $a'\,a'$ at their forward and lower ends, so as to engage with and retain the lower front edges of the channel bed-plates D, as illustrated in Fig. 8.

In placing the type-channel beds in position in the case the upper inner end of each bed is inserted above one of the front bars or shoulders, $a^2$, and the bed D slid upward until the lower front edge of its plate $d$ falls behind the said shoulder $a^2$, as indicated in Fig. 8, which thereafter sustains it in its position upon the inclined ribs $a'\,a'$, which support the edges of the plate $d$ at the sides.

Heretofore we have arranged the type-containing channels upon their flat sides in grooves $d^2$, separated by solid parallel ribs, (corresponding to the space $d^3$ in the drawings,) to the lower ends of which the finger-pieces J were attached, as will be seen by reference to the patents hereinbefore referred to; but in our present construction we form the divisions and grooves for the channel-base D by stamping out a sheet of metal, D', into the shape shown in Figs. 6, 7, and 13, and attaching such prepared sheet to a suitable base or stiffener, $d$. By this means, in addition to the usual channel-grooves, $g^2$, upon which the type-channels T are arranged upon their flat sides, as heretofore, we are enabled to utilize the spaces $d^3\,d^3$ for the reception of additional type-containing channels, which latter are preferably arranged on edge at or approximating right angles to the channels situated in the grooves $d^2$. Two extra type-containing channels may be thus arranged within the longitudinal spaces $d^3\,d^3$, when desirable; but we prefer to arrange a single extra type-channel in each such space, as shown in the drawings.

We use duplex finger-pieces J, formed each with two type-channel-supporting shoulders, $j'$ and $j^2$, and adjustable type-supports $j^3$ and $j^4$, constituting, respectively, the seats J' and J². The shanks J³ of the finger-pieces J are flanged and are inserted into the lower ends of the spaces $d^3$ and secured to the plate D' or base $d$, or both, in any suitable manner—as by riveting, soldering, or otherwise. Aside from their arrangement at an angle to each other, the type and channel-seats J' and J² are substantially the same in principle of construction as those shown and described in patent No. 268,409, in which an adjustable type-supporting shoulder is described and claimed broadly. In that case the type-supporting shoulder is sufficiently long and wide to bear the whole weight of the column of types above, and the adjustment of the screw increases or diminishes the size of the transverse slot formed by and between the lower side wall of the channel and the upper edge of the type-support, the adjusting-screw entering the spine of the type-containing channel itself. Our present construction embodies a finger-piece for the support of both channel and type-column, formed with a stationary channel-supporting shoulder, and with means for adjusting the available opening for the removal of the types below the position of the lower front side wall of the containing-channel when in position.

In the patent referred to the parallel type-supporting shoulder constitutes practically a part of the type-containing channel itself, and substantially the same form of type-shoulder and adjustment might be used upon the finger-piece in our present construction in combination with the stationary channel-supporting shoulders; but we prefer, for simplicity and also for the purpose of decreasing friction and facilitating a rapid "cut off" or removal of the types, to use a simple screw ($j^3$ or $j^4$) projecting upward through the lower part of the finger-piece into the path of the column of type above when the containing-channel is in position. The stationary type floor or shoulders $j^5 j^6$, against which the heels of the lowest types in a column rest, as shown in Fig. 10, are situated a sufficient distance below the stationary channel-supporting shoulders $j' j^2$ to afford the necessary degree of variation or adjustment to be attained between the ends of the screws $j^3 j^4$ and the lower side walls of the type-containing channels T.

It will be noticed that the protrusion of the ends of the screws $j^3 j^4$ above the floors $j^5 j^6$ not only regulates the available space through which the types may be withdrawn laterally, but also obviates all frictional contact with the types, excepting at the points of contact of the heel with the floor $j^5 j^6$ and of the body of the type with the end of the screw.

Figure 10:
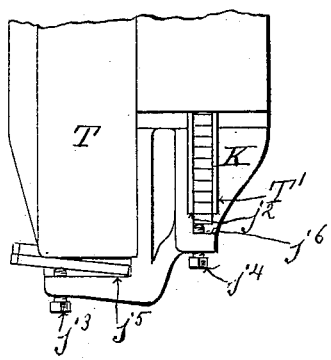

In order to render the operation of cutting off or removing a type as rapid as possible, we arrange the screws $j^3 j^4$ well back toward the channel-shoulders $j' j^2$, as shown in Fig. 10, so that only the rear portions of the types rest upon the screws, from which the types will be instantly detached and freed at the commencement of the lateral movement during their withdrawal.

We are thus, by a simpler and cheaper form of construction, not only enabled to attain the advantages of the adjustment of the type-supporting shoulder set forth in Patent No. 268,409, but also to attain in an increased degree the advantages of the contracted type-supporting shoulder described in Patent No. 279,168.

The type-containing channels T, arranged on the flat, may be inserted or removed from their grooves and seats as heretofore, and the other type-channels, T', arranged at an angle, may be also in like manner inserted or removed from the front of the case, the finger-pieces J being formed to permit of their insertion or removal through the space K. (Shown in Figs. 9, 10, 11, 12, and 14.)

In practice the case A may be made to accommodate as many sorts of types as may be desired, the case shown in the drawings being presumably for newspaper or other similar work, and having accommodation for fifteen type-channel beds, each of which, owing to the use of the duplex finger-pieces, will accommodate twenty channels, so that the case is adapted to receive three sorts of type—as nonpareil, minion, and agate. Thus when in use the compositor desires to change from one sort of type to another he has simply to press his foot upon the end of the lever F and raise or lower the case, as required, by hand, when by releasing the lever the case will be automatically locked in the new position, the exertion required being in any case comparatively slight, since an equilibrium between the case and the counterweight will be practically maintained continuously, owing to the fact that as fast as a channel is exhausted it is replaced by a full one, thus tending to maintain an average quantity of types in the case.

When it is desired to change or substitute an entire sort of type, the removable channel-beds D, each holding a large number of channels, facilitate the transfer.

Having thus set forth practical means for carrying out our invention, we desire to say that we do not confine ourselves strictly to the specific construction shown and described; but

What we claim as our invention, and desire to secure by Letters Patent, is—

1. The combination, with a compositor's type-case, A, adapted to hold two or more superposed series or "fonts" of type, substantially as described, of the suspenders $b\ b'$ and counterpoise B, arranged and operating substantially in the manner and for the purpose described.

2. In combination with a compositor's type-case, substantially such as designated, the suspending-ropes $b\ b'$, drums $a$ and C, and counter-weight B, arranged and operating substantially in the manner and for the purpose described.

3. In combination with the type-case A, counter-weight B, pulleys $a$ C, and suspenders $b\ b'$, a foot-brake, F, arranged and operating substantially in the manner and for the purpose described.

4. In combination with the type-case A, counter-weight B, pulleys a C, and suspenders b b', a pawl adapted to automatically engage with and restrain the motion of the parts and to be disengaged by foot-pressure, substantially in the manner and for the purpose described.

5. In combination with the type-case A, counter-weight B, pulleys a C, and suspenders b b', the guides G, for preserving the alignment of the case, substantially in the manner and for the purpose described.

6. In a compositor's type-case, substantially such as described, a duplex finger-piece formed with separate type-channels and type-supports arranged at an angle to each other, substantially in the manner and for the purpose described.

LOUIS K. JOHNSON.
A. AUGUSTUS LOW.

Witnesses:
WM. GARDNER,
GEO. W. MIATT.